:::

United States Patent
Wäsche et al.

(10) Patent No.: US 7,300,681 B2
(45) Date of Patent: Nov. 27, 2007

(54) METHOD FOR THE PRODUCTION OF PROTEIN PREPARATIONS WITH ESSENTIALLY CONSTANT PROPERTIES

(75) Inventors: Andreas Wäsche, Langenbach (DE); Thomas Luck, München (DE); Wolfgang Holley, Bruckberg (DE); Stefanie Dudek, Potsdam (DE)

(73) Assignee: Fraunhofer-Gesellschaft zur Forderung der Angewandten Forschung E.V., Munich (DE)

( * ) Notice: Subject to any disclaimer, the term of this patent is extended or adjusted under 35 U.S.C. 154(b) by 290 days.

(21) Appl. No.: 10/204,489

(22) PCT Filed: Nov. 29, 2000

(86) PCT No.: PCT/EP00/11970

§ 371 (c)(1),
(2), (4) Date: Dec. 11, 2002

(87) PCT Pub. No.: WO01/62101

PCT Pub. Date: Aug. 30, 2001

(65) Prior Publication Data

US 2004/0214300 A1  Oct. 28, 2004

(30) Foreign Application Priority Data

Feb. 21, 2000 (DE) ............................... 100 07 978
Apr. 29, 2000 (DE) ............................... 100 21 229

(51) Int. Cl.
*A23L 1/00* (2006.01)
(52) U.S. Cl. ................. 426/430; 426/432; 426/436
(58) Field of Classification Search ............... 426/430, 426/432, 436
See application file for complete search history.

(56) References Cited

U.S. PATENT DOCUMENTS 3,995,071 A    11/1976  Goodnight, Jr. et al.
4,060,203 A *  11/1977  Edwards et al. ................ 241/7
4,129,664 A *  12/1978  Kruseman et al. ............. 426/7
4,420,425 A *  12/1983  Lawhon ....................... 530/378
4,428,876 A *   1/1984  Iwamura ...................... 530/370
5,322,839 A     6/1994  Voegeli et al.
6,335,044 B1    1/2002  Wasche et al.

FOREIGN PATENT DOCUMENTS

DE          291 472          8/1928
DE       26 28 063 A1        1/1977
DE       28 32 843 A1        2/1979
DE          266 960 A1       4/1989
DE       196 40 992 A1       4/1997
DE       198 13 207 C1       6/1999
EP         0 261 586 A2      3/1988
GB          1 574 110        9/1980
WO         WO 91/12730 A2    9/1991

* cited by examiner

*Primary Examiner*—Anthony Weier
(74) *Attorney, Agent, or Firm*—Buchahan Ingersoll & Rooney PC

(57) ABSTRACT

Shown is a method for producing protein preparations having essentially constant functional properties for technical applications within a broad pH range from about pH 3 to pH 10 by means of extraction from a starting product which contains protein, notably legumes, grains or oilseed. The invention is distinguished by the protein-containing starting product undergoing at least one liquid extraction step and that the raffinate and/or extract obtained thereby undergoes at least one membrane separation process in which a residue is obtained or undergoes thermal upgrading in which a concentrate is obtained and that the residue or the concentrate contain the protein preparations having the desired functional properties.

18 Claims, No Drawings

METHOD FOR THE PRODUCTION OF PROTEIN PREPARATIONS WITH ESSENTIALLY CONSTANT PROPERTIES

FIELD OF THE INVENTION

The present invention relates to a method for the production of protein preparations with essentially constant properties with regard to solubility and functionality within a broad pH range from about pH 3 to pH 10 by means of extraction from a protein-containing starting product, notably legumes, grains and oilseeds. Furthermore, such a protein preparation and suited applications thereof are described.

BACKGROUND OF THE INVENTION

Proteins respectively protein preparations are considered as raw materials for the food and feed industries. They find much use in industrial chemistry, for example in the production of adhesives, emulsions for photographic coats and cosmetics just to name a few applications.

The major significance of protein preparations for all living things, for products and materials of the entire food chain and for a multiplicity of products and materials for industrial applications are based on the functional properties of the individual proteins, such as being water-bound or oil-bound, foam formation, moreover dispersion, solubility, gel formation, viscosity, emulsifiability and thermostability.

Depending on the type of proteins, their functional properties are different and change essentially in dependence of certain parameters, such as for example in dependence of the ambient temperature or the pH value. Depending on the technical requirements, the functional properties of protein preparations can be selectively adjusted by selecting the external parameters, such as disclosed for example in DE 197 21 079 A1. Thus, solubility, viscosity and other certain functional properties for technical applications can be selectively adjusted by means of corresponding selective thermal treatment.

In the industrial production of protein preparations based on vegetable proteins, of the legumes lupine seeds and peanuts, peas and soybeans are of the greatest significance as a starting product compared to all the other vegetable starting materials because legumes possess approximately 40% protein. Oilseeds, for example poppy seeds, sesame seeds, coconuts, almonds, linseeds, rape seeds, sunflower seeds etc. as well as wheat, corn, rye etc., are vegetable starting products for producing protein preparations even if they contain less protein than the aforementioned legumes.

For large-scale production of protein preparations, in particular for the production of protein isolates which have a protein content of more than 90% as dry substance, legumes such as soybeans or lupines undergo multistage process steps.

First the proteins are extracted from the starting materials with the aid of an alkaline aqueous solution after, if required, the starting materials had undergone a preceding acidic extraction. The extraction, which is carried out under alkaline conditions, is followed by precipitation of the proteins under acidic conditions. Finally the proteins precipitated in this manner are dried and are then available for suited technical as well as food-related applications. A prior art method of production is, for example, disclosed in DE 198 13 207 C1.

The protein preparations produced with the prior art methods of production respectively isolation possess, due to the method of separation utilized in their production, pH-value dependent solubility properties, which have a marked minimum in particular in the case of acid pH values, i.e. in the case of pH values of <7 and in particular in the case of pH values from 4 to 5, protein preparations produced in this manner are poorly soluble in water respectively completely insoluble in water.

The protein preparations produced with prior art methods behave in the same manner with regard to their functional properties, for example with regard to emulsification and foam formation. Accordingly, the protein preparations emulsify significantly worse in an acid range than in a neutral respectively slightly alkaline range, i.e. the ability to stabilize emulsions worsens considerably. Emulsifiability plays an important role especially in the food and cosmetic industries, for example in the production of dressings, sauces, mayonnaise or cosmetic products such as creams or salves and technical products such as adhesives, glues, rubber mixtures, etc.

For many applications, however, for example in the areas of food production, cosmetics as well as in the area of technical products it is desirable to use protein products whose functional properties are largely independent of parameters such as, in particular, the pH value, ionic strength and/or temperature. Such type protein preparations cannot, however, be produced with the present methods of production, in particular, not on a large industrial scale. Production methods for protein preparations having these property profiles are based on modifying the proteins, which occurs following protein production and is usually technically very complicated, such as is carried out, for example, using hydrolytic enzymes.

SUMMARY OF THE INVENTION

The object of the present invention is to provide a method for producing protein preparations with which the production of protein preparations is possible on an industrial scale, whose functional properties for technical applications, in particular, with regard to emulsification and foam formation, are largely independent of the pH value in the range between pH 3 and pH 10. Moreover, the protein preparations produced with the invented method should posses almost unchanged solubility properties in water even at temperatures up to 100° C. In particular, the protein preparations should have a wide spectrum of use so that they can be employed in many products with regard to foodstuffs and technical products as well as cosmetic products.

The solution to the object on which the present invention is based is set forth in claim 1. Alternative variants of the method according to the present invention are put forth in other claims. Advantageous features are the subject matter of the subclaims and the entire description.

The starting product for the invented method for the production of protein preparations having largely constant functional properties within a broad pH range of about pH 3 to pH 10 are the as such known legumes or oilseeds. The invented method is based on an extraction having the following steps:

First the protein-containing starting product undergoes an aqueous extraction step. The obtained extract is then either subjected to at least one membrane separation process in which a residue is obtained or undergoes thermal upgrading in which the concentrate is obtained. In both instances, whether it be the obtained residue or the obtained concentrate, protein preparations with the desired functional properties are obtained.

The new protein preparations produced in the aforedescribed manner have a protein content between 60 and 95% as dry substance and possess functional properties which are not achievable with the prior art methods: accordingly the new protein preparations possess high solubility as well as resolubility in aqueous systems in a pH range between 3 and 10. Furthermore, they possess thermostability in the same broad pH range and retain their solubility even at temperatures from up to 100° C. In particular, the quality of foam formation and emulsifiability of the novel protein preparations proves to be almost constant over a broad pH range between 3 and 10. Finally, they possess a high sulfurous amino acid content which is especially advantageous for physiological nutritional reasons with regard to chemical modifiability.

The reason for such strikingly favorable behavior with regard to their functional properties appears to be the relatively high content of nonprecipitable globular protein fractions with a molecular weight of approximately 200,000 D in the produced protein preparations (in particular produced from lupines). Alternative possible technical production of such type protein preparations having a similarly high proportion of nonprecipitable globular protein fractions have hitherto not been known.

Analyses of the protein preparations produced from legumes, in particular lupine seeds, using the invented method possess a high gamma-conglutinin content corresponding to a fraction which distinctly differs from all other protein preparations with regard to their amino acid composition as well as solubility and pH-dependent solubility.

DETAILED DESCRIPTION OF THE INVENTION

Described in the following are four alternative variants of the method suited for the invented production of high-molecular protein preparations having the desired almost pH-value independent functional properties. Suited as the starting material for the to-be-obtained protein preparations are preferably comminuted, that is ground, flaked or pelletized lupine seeds, preferably produced from shelled lupines, such as for example L. albus, *L. luteus, L. angustifolius, L. mutabilis*. The comminuted lupine seeds may be faculatively deoiled in a preliminary process, such as for example as disclosed in the German printed publication DE 198 13 207 C1. As an alternative also suited as a starting material are soybeans, peas, grain and oilseeds.

Variant 1:

First the comminuted and faculatively deoiled lupine seeds are extracted in an acid water extraction at pH values between 3 and 6, with no chemical reactions occurring between the solvent water and the dissolved lupine seed fractions. Various separation processes can be used for the actual separation between the solid parts, the so-called raffinate I and the liquid part, the extract I, such as for example using a decanter, separator or a filter. Also suited for separation is a continuously operating drum centrifuge. The raffinate I obtained in this separation is then extracted using alkalized water at pH values of 7 to 10 and divided following renewed solid-liquid separation into an extract II and a raffinate II. In this case too, separation occurs using the state of the art separation process. The liquid extract II obtained in the second separation step is acidified to a pH value between 3 and 5.5 by adding an acid in doses due to which the predominant part of the proteins in the liquid extract II is precipitated. Acidification yields as the precipitant a precipitated protein in the form of a protein curd and excess liquid.

The excess liquid obtained by precipitation is then separated from the protein curd in a further solid-liquid separation, for example using a continuously operating drum centrifuge, thereby yielding liquid whey with a protein content of 85% to 95% in dry substance.

The whey yielded in this manner is then undergoes to a membrane separation process preferably by way of ultrafiltration with the target product, notably the protein preparation, with the desired pH-value-independent functional properties corresponding to the part of the whey retained by the membrane, the residue. The membranes used in the ultrafiltration usually have pores which permit particles up to 10,000, 20,000 or 50,000 dalton (D) to pass. In this manner, higher molecular constituents such as the desired proteins having molecular weights from up to 200,000 D remain as residue.

The residue yielded in this manner is predominantly composed of the desired high-molecular proteins, whose purity may be optionally further improved by the residue undergoing a subsequent washing step. Suited for this additional washing step is conducting diafiltration in which the present high molecular protein is continuously or periodically washed, preferably in a multistage process, with water or a suited buffer solution. After corresponding drying, for example by spray drying, a high-molecular, protein preparation of highest purity is produced which possesses the properties mentioned in the introduction. The liquid parts, which essentially are composed of low-molecular constituents such as sugar, salts, amino acids and peptides, separated in the diafiltration can either be discarded as waste water or be further processed for selectively obtaining individual substances.

As an alternative to conducting ultrafiltration of the whey obtained by means of the above described solid-liquid separation, the whey can also be upgraded by means of evaporation yielding a concentrate which, after corresponding drying, preferably spray drying, also corresponds to a high-molecular protein with the desired functional properties.

The protein preparation producible using the aforedescribed variant 1 has a very high sulfurous amino acid content and is therefore particularly suited for nutritional applications, for example additives to baby food, health food products as well as for hospital food. Furthermore, the protein preparations possess especially good foam formation properties surpassing the foam volume values of common products threefold.

Variant 2:

As in variant 1, the comminuted and faculatively deoiled lupine seeds undergo an aqueous extraction at pH values from 3 to 6 and are then separated in solid-liquid separation into a raffinate and an extract. In contrast to variant 1, the liquid extract is selectively further processed. It immediately undergoes a membrane separation process, for example ultrafiltration, in which the protein preparation with the desired functional properties is already obtained as residue, thus that very constituent that is retained by the membrane utilized in the membrane separation process. As the residue has, despite ultrafiltration, only about a protein content in dry substance of 50%, the concentration of the high-molecular protein preparation can be increased in the whey present as residue by washing the residue by conducting diafiltration. Preferably water is employed as the wash liquid. By drying, preferably spray drying the washed residue, possibly in conjunction with fluidized bed treatment, the protein can be obtained as a dry product with suited particle packing.

The protein preparation produced in this manner is particularly distinguished by it especially good solubility in a very broad pH range. The liquid parts separated in the diafiltration essentially contain water as well as low-molecular constituents such as sugar, salts, amino acids and peptides, which can be discarded in the form of waste water or further processed in order to obtain single substances.

Variant 3:

The third alternative variant for producing a high-molecular protein preparation with the desired functional properties, in particular with regard to their good solubility, foam formation and emulsification over a broad pH range between pH 3 to pH 5 is a combination of the variants 1 and 2 described in the preceding. Accordingly, the whey produced in variant 1, which is obtained from the excess liquid by means of solid-liquid separation, is selectively utilized as the wash liquid instead of water when conducting the diafiltration in variant 2. The use of whey as the wash liquid yields advantages with regard to the water content of the entire process, thereby permitting raising efficiency respectively effectively. Moreover, the protein preparations produced in this manner possess functional properties corresponding to those produced with variant 1 as well as with variant 2.

Variant 4:

In contrast to the preceding variants 1 to 3, the comminuted and facultatively deoiled lupine seeds undergo aqueous extraction at alkaline pH values from 7 to 10. The liquid extract obtained following solid-liquid separation undergoes precipitation by means of acidification to pH values between 3 and 5.5, for example by addition of sulfuric or hydrochloric acid, in which the major part of the proteins contained in the liquid extract is precipitated. The excess liquid yielded in the precipitation is separated by means of solid-liquid separation preferably with the aid of a decanter, thereby yielding the so-called whey. The proteins dissolved in the whey are then obtained in the residue with the aid of a membrane separation process, preferably using ultrafiltration. The residue is predominantly composed of high-molecular proteins which possess the aforedescribed properties. As in the aforedescribed variants, in this case too the residue yielded by ultrafiltration can also be washed with the aid of diafiltration using water as a washing liquid to further increase the concentration. Within the scope of the subsequent spray drying process, high-molecular protein preparations, for example with a solubility of more than 80% over a broad pH range, can in this way be produced in a technically efficient manner.

Protein preparations produced by means of the four aforedescribed variant methods show very good solubility in water in the application-relevant pH range (pH 2 to 12).

The extraction steps and the solid-liquid separation processes, in which water is preferably used as the solvent, are preferably conducted at temperatures between 5 and 70° C., with temperatures from 15 to 60° C. being especially suited. The addition of water as the solvent for the extraction occurs in such a manner that a solid-liquid ratio between 1:3 to 1:15 is yielded, with the preferred ratio being between 1:4 and 1:10.

Fundamentally, the ultrafiltration may occur at pH values between 3.5 and 9, the preferred pH values lying between 6 and 8 pH. Prior to carrying out the ultrafiltration, the to-be treated whey can be preferably pasteurized or undergoes high-temperature treatment. Typical temperatures for conducting the ultrafiltration lie between 10° C. and 80° C., preferably between 60° C. to 80° C. In addition, the membranes used in the ultrafiltration possess selecting membrane apertures through which the particles with molecular sizes of 100,000 D can permeate.

The protein preparations produced with the aforedescribed variants methods all have a protein content of >80% in dry substance, preferably >85%. Their salt content is usually 3% to 5%. In the case of extractive deoiling of the raw material, the fat content of the produced preparation is under 1%, with the protein preparations produced by means of variant 2 having a particularly low fat content.

Due to the especially favorable functional properties, in particular with regard to their solubility, thermostability, emulsifiability, foam formation and gel formation, whose behavior is constant practically over the entire pH range, the new high-molecular protein preparations are suited for numerous important applications. Thus, they serve as additives for the following products; foams, gels and gel-like substances, foods, beverages, feeds and cosmetic products and technical products such as adhesives, pasty lubricants, paints etc. Employing the new protein preparations permits selectively adjusting the functional properties of individual products, for example with regard to their solubility, emulsifiability, thermostability, foam formation and gel formation.

Finally, due to their high proportions of sulfurous amino acids, the new proteins, in particular those produced with the aid of variant method 1, permit derivation, i.e. the conversion into certain protein compounds that are especially suited for special applications, which offer a wide spectrum for producing further new modified preparations.

What is claimed is:

1. A method for producing protein preparations having essentially constant functional properties for applications within a broad pH range from about pH 3 to pH 10 by means of extraction from a starting product which contains protein, said starting product including a member selected from the group consisting of a legume, a grain and an oilseed, the method comprising the following process steps:
a) comminution of the starting product and addition of said comminuted starting product to a first acidic solvent in order to obtain an acidic suspension,
b) separation of said acidic suspension into a raffinate I and an extract I by way of solid/liquid separation at a temperature between 5° C. and 70° C.,
c) addition of said raffinate I to a base solvent in order to obtain a base suspension,
d) separation of said base suspension into a raffinate II and an extract II by way of solid/liquid separation,
e) acidification of said extract II and precipitation of the proteins from said acidified extract II in the form of protein curd in order to obtain an excess liquid,
f) separation of said excess liquid by way of solid/liquid separation in order to obtain said excess liquid having a protein content of >80% by dry weight,
g) addition of said excess liquid to a residue, which is produced by separation of said extract I using a membrane separation process in order to obtain the residue containing the protein preparations having desired properties, and said excess liquid is used as washing liquid within the scope of diafiltration, and
h) washing the proteins having desired properties obtained in said residue.

2. A method for producing protein preparations having essentially constant functional properties for applications within a broad pH range from about pH 3 to pH 10 by means of extraction from a starting product which contains protein, said starting product including a member selected from the group consisting of a legume, a grain and an oilseed, the method comprising the following process steps:

a) comminution of the starting product and addition of said comminuted starting product to a first acidic solvent in order to obtain an acidic suspension, b) separation of said acidic suspension into a raffinate I and an extract I by way of solid/liquid separation at a temperature between 5° C. and 70° C., c) addition of said raffinate I to a base solvent in order to obtain a base suspension, d) separation of said base suspension into a raffinate II and an extract II by way of solid/liquid separation, e) acidification of said extract II and precipitation of the proteins from said acidified extract II in the form of protein curd in order to obtain an excess liquid, p1 f) separation of said excess liquid by way of solid/liquid separation in order to obtain said excess liquid having a protein content of >80% by dry weight, g) addition of said excess liquid to a residue, which is produced by separation of said extract I using a membrane separation process in order to obtain the residue containing the protein preparations having desired properties, and said excess liquid is used as washing liquid within the scope of diafiltration, and h) washing the proteins having desired properties obtained in said residue, wherein said residue obtained by said washing is spray dried.

3. The method according to claim 1, wherein said acidic suspension possesses a pH value between 3 and 5.

4. The method according to claim 1, wherein said starting product is a lupine seed selected from the group consisting of an *L. albus*, an *L. luteus*, an *L. angustifolius* and an *L. mutabilis*.

5. The method according to claim 1, wherein ground, flocked, pelletized and/or shelled lupines or other legumes or grains or oilseeds are employed as said starting product.

6. The method according to claim 1, wherein said starting product is deoiled.

7. The method according to claim 1, wherein separation membranes having exclusion sizes in the range between 500 and 200,000 D are utilized for said membrane separation process.

8. The method according to claim 1, wherein water mixed with acidified or alkaline substances depending on the pH setting is utilized as said solvent.

9. The method according to claim 1, wherein solid/liquid ratios of 1:4 to 1:10 are maintained during said extractions.

10. The method according to claim 1, wherein a pH value between 6 and 8 is set during said membrane separation process and a temperature between 60 and 80° C. is set during said membrane separation process.

11. The method according to claim 2, wherein said acidic suspension possesses a pH value between 3 and 5.

12. The method according to claim 2, wherein said starting product is a lupine seed selected from the group consisting of an *L. albus*, an *L. luteus*, an *L. angustifolius* and an *L. mutabilis*.

13. The method according to claim 2, wherein ground, flocked, pelletized and/or shelled lupines or other legumes or grains or oilseeds are employed as said starting product.

14. The method according to claim 2, wherein said starting product is deoiled.

15. The method according to claim 2, wherein separation membranes having exclusion sizes in the range between 500 and 200,000 D are utilized for said membrane separation process.

16. The method according to claim 2, wherein water mixed with acidified or alkaline substances depending on the pH setting is utilized as said solvent.

17. The method according to claim 2, wherein solid/liquid ratios of 1:4 to 1:10 are maintained during said extractions.

18. The method according to claim 2, wherein a pH value between 6 and 8 is set during said membrane separation process and a temperature between 60 and 80° C. is set during said membrane separation process.

* * * * *